Nov. 2, 1965 L. C. CLAPP 3,215,988

MASER MEMORY SYSTEMS

Filed July 27, 1961 5 Sheets-Sheet 1

INVENTOR.
LEWIS C. CLAPP
BY
ATTORNEY

INVENTOR.
LEWIS C. CLAPP
BY F. I. Sullivan
ATTORNEY

INVENTOR.
LEWIS C. CLAPP
BY F. I. Sullivan
ATTORNEY

INVENTOR.
LEWIS C. CLAPP
BY F. L. Sullivan
ATTORNEY

INVENTOR.
LEWIS C. CLAPP
BY F. J. Sullivan
ATTORNEY 3,215,988
Patented Nov. 2, 1965

3,215,988

MASER MEMORY SYSTEMS

Lewis C. Clapp, 62 Whites Ave., Watertown, Mass.

Filed July 27, 1961, Ser. No. 127,404
3 Claims. (Cl. 340—173)

This invention relates to electronic memory systems and data processing equipment and more particularly to improved methods and devices for storage and processing of information in such systems.

Copending United States patent application, assigned to Sylvania Electric Products Inc., Serial No. 679,967, filed on August 23, 1957, now Patent No. 3,058,096, describes a magnetic core memory system which is typical of those commonly used for electronic data processing. That application and the references cited therein may be consulted for a detailed description of such memories, their operation, and associated input and output circuitry.

Briefly summarizing the operation of magnetic core memories, they comprise a plurality of ferrite cores connected to a matrix arrangement. When an individual core is pulsed by a current of sufficient magnitude and a given polarity, its residual magnetic flux is set in one direction, where it remains until it is reversed by a pulse of opposite polarity. This reversal of flux induces an output signal in a sense winding linking the cores. In this manner, a binary bit of information, i.e. "0" or "1," may be written into, stored in, or read out of each core in the system.

The general arrangement of the aforementioned memory matrix is in planes with the cores of each plane in horizontal rows, X, and vertical columns, Y. Flux reversal in a given core is accomplished by applying a current pulse of half the necessary amplitude to both its X and Y coordinates. The combined effect where the coordinates intersect is then sufficient to switch that particular core from one state of remanent magnetic flux to another. Speed capability of these coincident current magnetic core memories has thus far been limited to the order of one microsecond read-write cycle time.

Accordingly, an object of the present invention is to provide an improved means for storing and processing electronic data, and one whereby speed capability is greatly increased.

These and other objects are accomplished in one embodiment of the invention by making use of the so-called "Maser Theory" of inverting and re-inverting electron population at various energy levels with a particular material. For instance, the Boltzmann equation relates a theory of distribution of various energy levels wherein the lower levels are inherently more populated than upper levels. This situation may be reversed so that the upper energy levels have the greater electron population, by inducing an energy signal into the material. Inducing a second signal then causes a transition to the original Boltzmann state, which in turn produces a detectable emission of energy. The invention takes advantage of this phenomenon by assigning binary values to the population of energy levels.

Other objects and features of the invention and alternative embodiments will be apparent from the following description and reference to the accompanying drawings, wherein.

Figure 1:
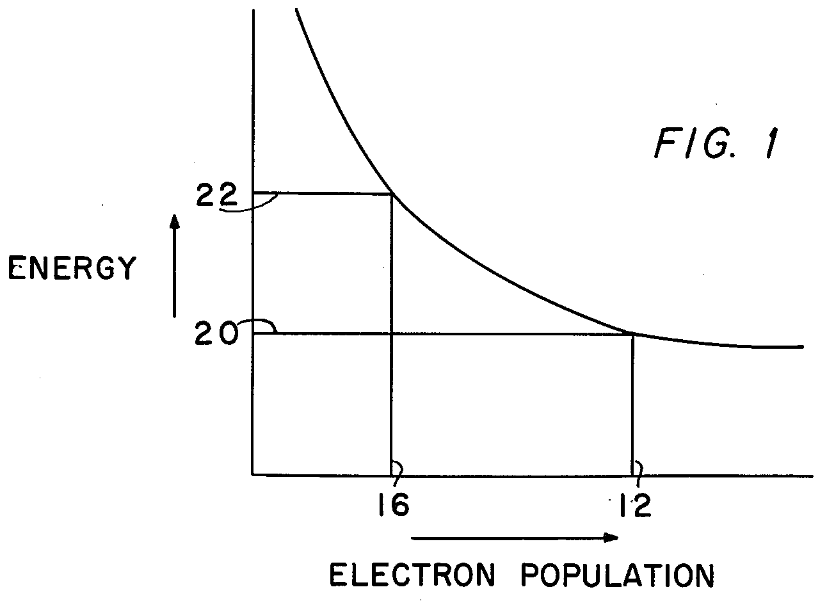
FIG. 1 is a graphical representation of the Boltzmann equation.
Figure 2:
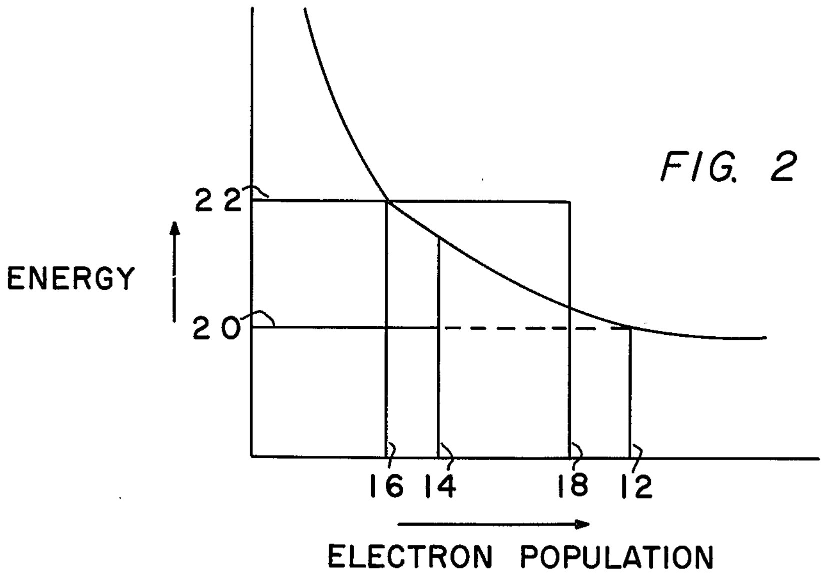
FIG. 2 is a graphical representation of an inverted Boltzmann distribution.

A two level maser is particularly suitable for use as a storage device for binary information. When the distribution of energy electrons is akin to that directed by the Boltzmann formula $$N=Ce\frac{-Ei}{KT}$$

where K is the Boltzmann constant, T is the absolute temperature of the sample, C is a constant, N is the population at a given energy level, *e* is the base of Napierian logarithms (approximately 2.718), E is Planck's constant, and *i* is the frequency of the transition, the situation may be represented as shown in FIG. 1. Assuming this Boltzmann distribution to represent a binary "0," a write signal may be introduced with sufficient power to invert or equalize the level populations by a process known as pumping, so that the electron distribution is as shown in FIG. 2, and in that state, a binary "1" may be represented. It may be seen that population or amplitude 12 in FIG. 1 has been reduced to population or amplitude 14 in FIG. 2; and, population or amplitude 16 shown in FIG. 1 has been increased to 18 in FIG. 2. This phenomenon is according to the well known principles of operation of masers and has been explained by Charles H. Townes in United States Patent No. 2,879,439, entitled "Production of Electromagnetic Energy." Briefly, maser operation depends on the fact that atomic particles exist at various discrete energy levels. A particle may jump from a lower energy level to a higher one by the absorption of energy in the form of electromagnetic radiation or the like. It may descend again to the lower state by releasing equivalent energy in the same form. During the period in which the atomic particles are excited to the higher energy level, they can emit energy spontaneously and revert to their ground state. Furthermore, during the period in which the atom remains excited, it can be stimulated to emit energy by being struck by incidental energy equal to the energy which would otherwise be emitted spontaneously. As a result of such stimulation, the incident energy is augmented by the energy released from the excited atoms. The released energy falls in phase with the incident energy, resulting in an amplifying action. This phenomenon is known as stimulated emission. The period in which an atom is an excited or higher energy state emits energy by either a spontaneous or stimulated emission process and reverts to a ground state or Boltzmann state is designated "relaxation time." In any collection or population of atoms, the energy levels of the various atoms are constantly changing as a result of energy transfers produced by random collisions. However, the distribution of energy levels in an atomic population can be changed by a process of "pumping," so that there will be more atoms in the higher state than in the lower state of a selected transition. This type of population is said to be "inverted."

With the foregoing basic principles involved in representing binary "1" or binary "0," a maser storage element may be developed in conformance with the following specification. FIG. 1 shows how the various energy levels of a material may be assumed to be populated under normal conditions. The lower level of energy distribution 20 is shown to be more substantially populated than upper levels such as 22. In a maser, an attempt is made to reverse this situation in such a manner that the upper state 22 has the greater population as shown with reference to FIG. 2. Shortly after this population inversion another signal is used to force previously excited electrons at level 22 in FIG. 2 back down to level 20. The resulting emission from these downward transitions is useful as an output signal for a memory device. If resonance factors are properly introduced to the system, high orders of signal amplification can be produced. However, once population inversion has been accomplished, there is a tendency for previously excited electrons to spontaneously drop back to the normal Boltzmann distribution without external stimulation. The time necessary for this spontaneous recess to occur may be referred to as relaxation time which is usually several orders of magnitude greater than the transition times involved when external stimulation is used.

Figure 3:
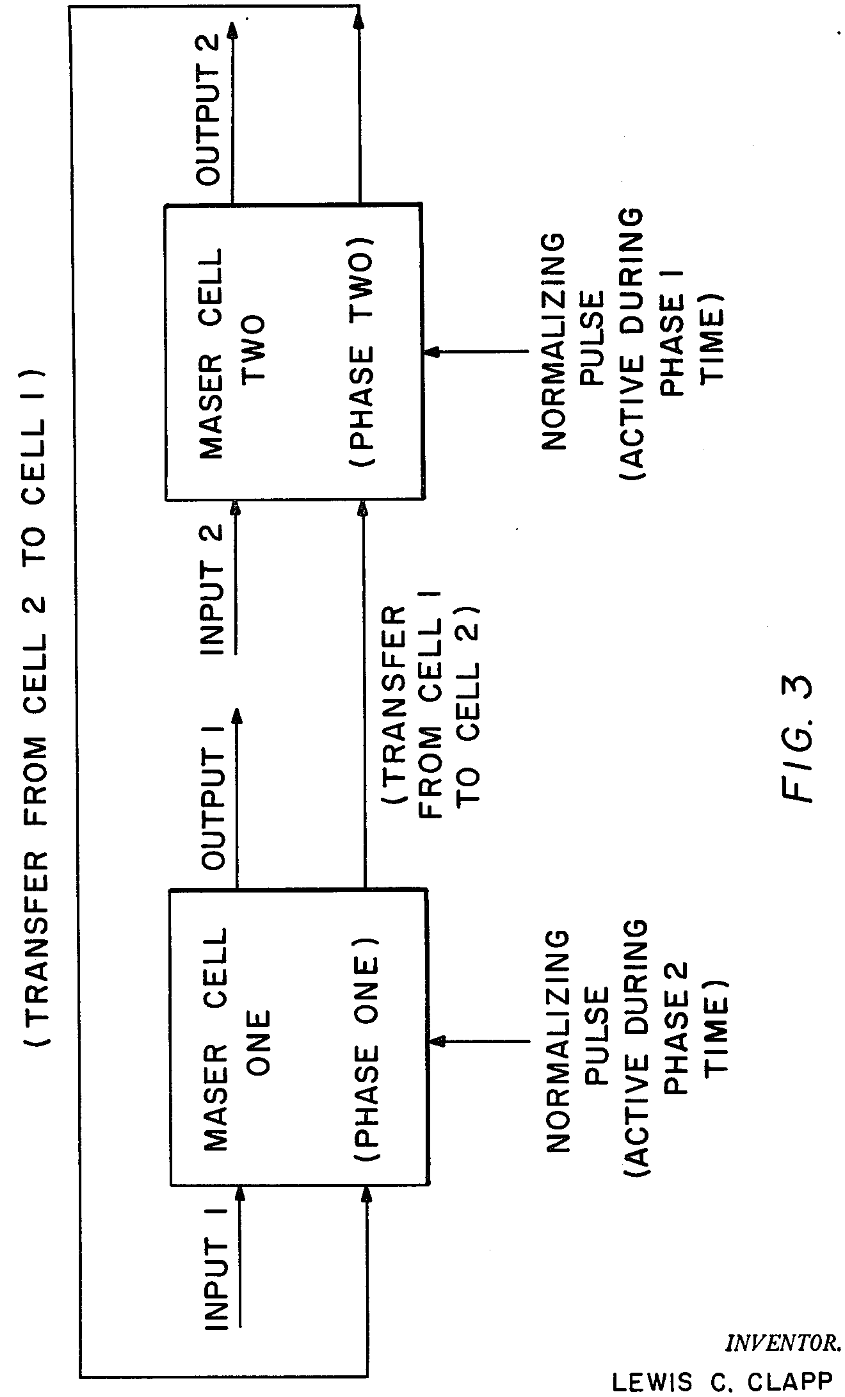
FIG. 3 is a schematic representation of a two-cell maser.

In order properly to make use of the maser model as a memory element, it is necessary, then, that relaxation times be relatively long in duration. To accomplish this, a number of methods may be employed. For instance, two maser cells may be connected in series and employed for the storage of each single bit as shown in FIG. 3. During phase one of a memory operating cycle, the first cell may be used for reading or writing information according to the methods previously mentioned. At the same time, a normalizing pulse may be used for returning second cell electrons to the Boltzmann distribution, or inverting electrons in the Boltzmann distribution at that time. For instance, assuming a "1" to be an inverted Boltzmann distribution and a "0" to be a Boltzmann distribution, if cell one is a "0" and we excite it to a "1," the overload of electrons at energy level 22 will start to relax back to level 20. At some point where cell one is still recognizable as in the "1" state, one in a series of periodic excitation pulses may be applied to cell two so that the information in cell one is duplicated. In this way, the storage becomes non-destructible.

Another consideration is that cell one information is destroyed by its readout. Consequently, when information is recognized as a "1" in cell one, the energy emission from cell one, occurring when the cell becomes normalized, may be used for exciting cell two to the one state so that a non-destructive readout is accomplished.

Throughout this specification, light excited masers will be referred to as lasers, whereas microwave excited devices are referred to as masers. Either laser or maser theory, however, is applicable to the invention, and laser theory will now be used to illustrate a possible embodiment of the novel storage device in a digital computer.

A storage device which is actuated by the introduction of energy has been discussed. If this energy is considered to be in the form of light pulses, the transmission lines must be capable of transferring bits of information between internal points in the computer. Also, in addition to a storage element and a transmission capability a digital computer must have a third basic set of components in the form of a decision making element, a discussion of which follows.

To transmit light pulses from point to point, advantage may be taken of the fact that certain materials, e.g. flexible glass fibers, transmit light along preferred axes for relatively long distances with very little attenuation. Although there is some attenuation in passing a light beam down such a fiber, practically all this loss is due to absorption by the glass and amounts to less than a quarter of one percent of energy per inch. These optical fibers may be coated by a thin glass film of lower refractive index to eliminate "cross talk" between neighboring transmission lines and their cost compares favorably against the expensive wave guides required for microwave computers. The science of fiber optics is now a rapidly developing subject and is well treated in available literature.

By utilizing optical radiation as the carrier of information, a whole new class of decision making techniques is made possible. There are countless properties of light beams alone or light in interaction with crystals and other matter that may be employed to generate logic. For example, light may be polarized in several ways; linearly, elliptically, and circularly. In fact, a beam of circularly polarized light can be either right circularly polarized or left circularly polarized—that is to say, the electric vector of the light beam rotates to the right or left in the plane perpendicular to the axis of propagation. The ways in which two beams of circularly polarized light can be combined are summarized in the following table.

| Beam 1 | Beam 2 | Resultant Beam |
|---|---|---|
| $C_L$ | $C_L$ | $C_L$ |
| $C_L$ | $C_R$ | P |
| $C_R$ | $C_L$ | P |
| $C_R$ | $C_R$ | $C_R$ |

Where:
$C_R$=right circularly polarized
$C_L$=left circularly polarized
P=linearly polarized With three types of polarized light beams—linear, circular right, and circular left, ternary logic can be generated in addition to binary. If more than two beams are combined simultaneously, a majority decision logic can be used.

Since input equipments for computers and other electronic data processing equipment are electro-mechanical, optical data processing requires conversion from electrical impulse to optical signals. One useful technique for accomplishing this conversion utilizes the Kerr effect, in which the polarization vector of light passing through certain crystals is rotated by the application of an electric field. The magnitude of the rotation depends on the crystal material, the length of the light path and the strength of the electric field. Ordinary Polaroid filters may be used to monitor the outputs of such a conversion device, and photocells may be used as converters to translate optical signals to electrical pulses for operating the output equipment tied to the computer. Although the photocell is a relatively slow component, its speed is comparable to the electro-mechanical input-output devices presently available.

Other methods of storage utilizing either the maser or laser technique take advantage of spin states of electrons. It is well known that an electron has only two possible directions of spin. Information may be stored and recognized by applying a "1" label to one direction of spin and a "0" label to another direction of spin, and these spin states may be controlled by various types of energy excitation.

Also, one cell of material may be used to store more than one bit of information since control may be had over more than two levels of energy. For instance, a four level maser may be used to store two bits of information by controlling the electron population at various levels and inverting this energy distribution between any two levels. This type of theory can also be used to alleviate the relaxation problem mentioned above in the same way as a two cell maser, also explained previously.

Figure 4:
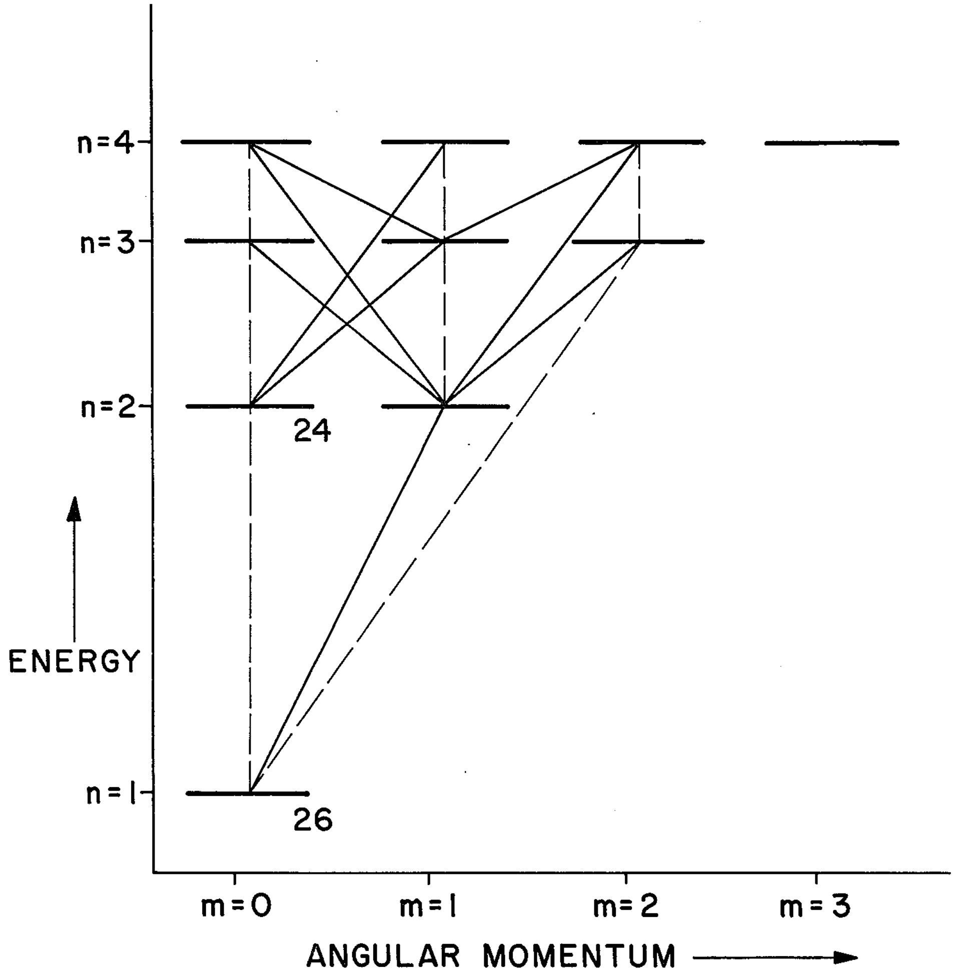
FIG. 4 is a graphical representation of energy levels and sub-levels for a given material.

The Boltzmann theory of energy distribution (FIG. 1) can also be used to implement a memory storage device in the form of gaseous matter. For instance, the hydrogen atom can absorb incident radiation, which will cause the electron to be elevated to a higher energy state, and the frequency of this incoming radiation determines the resultant energy level which the electron achieves. Conversely, an electron in a higher state of energy will spontaneously radiate down to a lower energy level according to the frequency of emitted, as opposed to absorbed, radiation. FIG. 4 shows that transitions between certain sub-levels of energy cannot occur. These may be referred to as forbidden transitions and are indicated by the dotted lines in FIG. 4. They may not take place because of a quantum selection rule which only permits transitions in which $m$ changes by $\pm 1$. From these facts it may be concluded that if an electron falls into state 24, it is trapped in the absence of external radiation. The only state of lower energy is state 26, and this cannot be reached since $m$ would not change by unity in such a transition. Such trapped electrons are frequently referred to as being in a metastable state. The foregoing theories may be substantiated by reference to Herzberg, "Atomic Spectra," Dover Publications, 1944, or Richtmeyer and Kennard, "Introduction to Modern Physics," McGraw-Hill, 1947.

Figure 5:
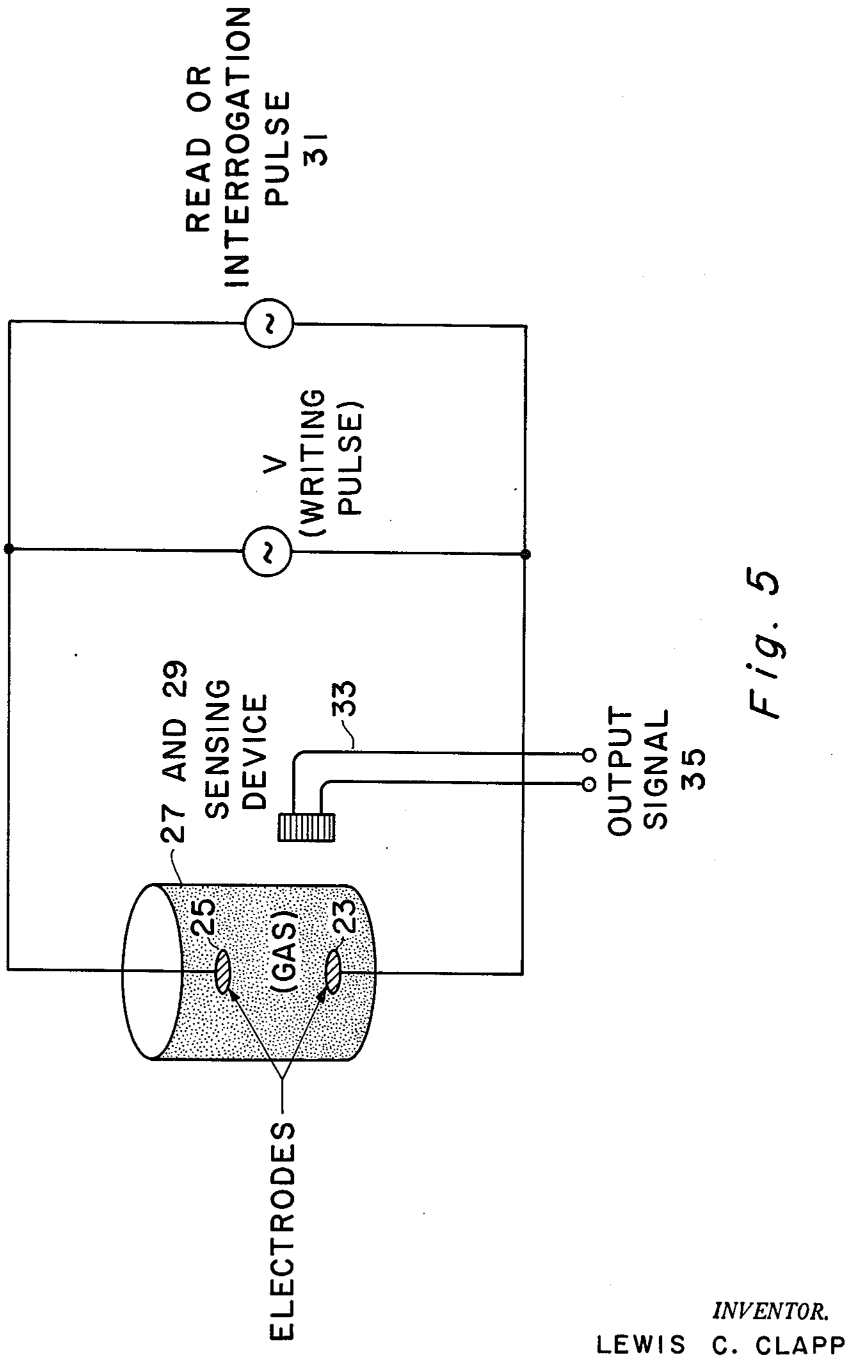
FIG. 5 is a schematic representation of a single bit gaseous storage element.

An embodiment of these gaseous principles for storing data is represented in FIG. 5 wherein a small vessel is shown having two electrodes 23 and 25 encapsulated with a first gas 27 such as hydrogen and a second gas 29 with an ionization potential well below the energy of metastable state 24 (FIG. 4). This second gas 29 merely provides free electrons which impart energy to metastable atoms of gas 27 during the reading and writing processes. When atoms of gas 27 are in the normal energy distribution, i.e. the ground state 26 (FIG. 4), a logical "0" is assumed to be stored in the cell. A voltage pulse V, will cause the free electrons to excite the atoms of gas 27, to higher energy levels after which many will radiate down to the state 24 (FIG. 4). The remainder will return primarily to the ground level 26 (FIG. 4). Those electrons in metastable level 24 (FIG. 4) will remain trapped until a small read pulse 31 is applied. This will result in perturbation of the electrons in state 24 (FIG. 4) through collision with a consequent induced transition back to ground 26 (FIG. 4) and a corresponding emission of radiation. This radiation may be detected by an external radiation detector 33. If the memory cell were in the "0" state, an interrogation pulse would only shift the energy level of the ground state 26 (FIG. 4) electrons slightly and no significant output signal 35 would result. It is clear that the same actions can be caused by admitting radiation into the cell to effect the transitions from ground to the upper levels and to induce transitions of trapped electrons to ground.

Figure 6:
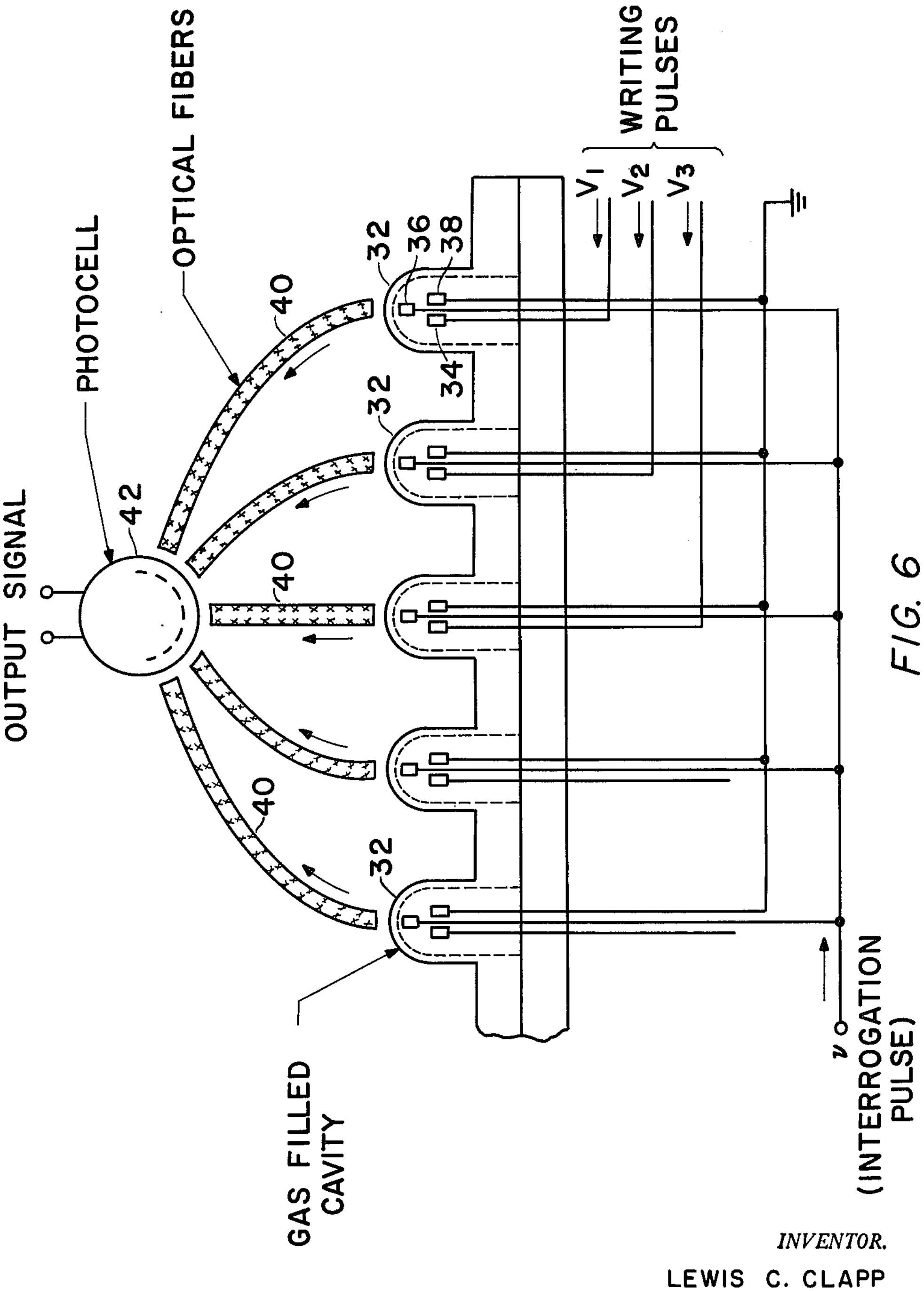
FIG. 6 is a schematic representation of a memory system incorporating the invention.

Utilizing this technique, a large scale memory is constructed in the following manner (see FIG. 6) with potential switching times of $10^{-9}$ seconds. Two glass plates 28 and 30 are joined in a gaseous environment so that the upper plate which contains many spherical half cavities 32 encloses the gas. Protruding from the lower flat plate 30 are separate groups of three electrodes 34, 36, 38 which are used to excite the gas in each cavity during read and write operations. Each cavity is activated by its electrodes at the appropriate time through the mechanism described in the preceding paragraph. The radiation output which occurs on the detection of a stored logical "1" is channeled through an optical fiber 40 to a photocell 43 associated with a particular group of bits. The electrodes 34, 36, 38 in each storage cell have been included here strictly for simplicity of description. The atoms in a cell may also be excited through radiation, thus eliminating the need for electrodes and all attendant mechanical construction problems.

Illustrative embodiments of the invention have been described with reference to specific materials and configurations. These are not to be taken as limitations on the invention itself, which embraces the full scope of the following claims.

What is claimed is:

1. A memory system comprising: a plurality of memory storage elements including hydrogen gas and operative to store information in the form of the Boltzmann distribution of energy and electron population and in the form of deviations from the Boltzmann distribution; means for transporting energy to said memory storage elements; a source of radiation energy operative to invert the Boltzmann distribution and reconvert the inverted Boltzmann distribution, depending upon which distribution exists; a sensing device comprising a photocell operative to detect radiation emission caused by conversion of an inverted Boltzmann distribution to a Boltzmann distribution by said source of energy; and fiber optic means for conveying said emitted radiation to said photocell.

2. A non-destructive read-out storage device for binary information comprising first and second maser devices each including input and output means; a source of energy coupled to the input means of said first maser device and operative to cause a stimulated emission of energy from said first device; and sensing means coupled between the output means of said first device and the input means of said second device for sensing the energy emitted by said first device and transmitting said energy to the input means of said second device to cause an output from the output means of said second device at a time later than the output from the output means of said first device.

3. A memory system comprising, a plurality of storage elements each including a maser device operative to store information in the form of the Boltzmann distribution of energy and electron population and in the form of deviations from the Boltzmann distribution, a source of radiant energy, means for transporting energy from said source to said maser devices and sensing light radiation from said elements, said transporting means including means operative to distinguish between directions of polarizations of light energy and combinations of the directions of polarization of light energy.

References Cited by the Examiner

UNITED STATES PATENTS

| | | | |
|---|---|---|---|
| 2,833,936 | 5/58 | Ress | 340—173 |
| 2,997,581 | 8/61 | Bolef et al. | 330—4 |

OTHER REFERENCES

Pages 232–238, July 1957—IBM Publication, IBM Journal, "Microwave Amplification Techniques," by Maser by W. V. Smith.

Pages 40–44, Nov. 3, 1961—Electronic Publication, "Lasers: Devices and Systems—Part II" by Dulberger Electronics.

IRVING L. SRAGOW, *Primary Examiner.*